US010467100B2

(12) United States Patent
Steffko et al.

(10) Patent No.: US 10,467,100 B2
(45) Date of Patent: Nov. 5, 2019

(54) HIGH AVAILABILITY STATE MACHINE AND RECOVERY

(71) Applicant: HGST Netherlands B.V., Amsterdam (NL)

(72) Inventors: Ladislav Steffko, San Ramon, CA (US); Vijay Karamcheti, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 206 days.

(21) Appl. No.: 15/236,818

(22) Filed: Aug. 15, 2016

(65) Prior Publication Data

US 2018/0046549 A1 Feb. 15, 2018

(51) Int. Cl.
| | |
|---|---|
| G06F 11/00 | (2006.01) |
| G06F 11/14 | (2006.01) |
| G06F 11/16 | (2006.01) |
| G06F 11/20 | (2006.01) |
| G06F 1/18 | (2006.01) |
| G06F 11/10 | (2006.01) |

(52) U.S. Cl.
CPC ............ *G06F 11/1423* (2013.01); *G06F 1/18* (2013.01); *G06F 11/1084* (2013.01); *G06F 11/1625* (2013.01); *G06F 11/2015* (2013.01); *G06F 11/2023* (2013.01); *G06F 11/2092* (2013.01)

(58) Field of Classification Search
CPC ............ G06F 11/1084; G06F 11/1423; G06F 11/1625; G06F 11/2015; G06F 11/2023; G06F 11/2033; G06F 11/2089; G06F 11/2092; G06F 1/18
See application file for complete search history.

(56) References Cited

U.S. PATENT DOCUMENTS

| | | | | |
|---|---|---|---|---|
| 7,627,780 B2* | 12/2009 | Davies | ................ | G06F 11/2028 714/10 |
| 7,886,182 B1* | 2/2011 | Coatney | .............. | G06F 11/2028 714/11 |
| 8,755,176 B2* | 6/2014 | Davis | .................... | G11B 33/128 361/601 |
| 9,110,649 B2* | 8/2015 | Matsuda | .................... | G06F 1/26 |
| 9,645,940 B2* | 5/2017 | Danilak | .............. | G06F 12/0246 |
| 9,846,624 B2* | 12/2017 | Young | ................. | G06F 11/2033 |

(Continued)

*Primary Examiner* — Marc Duncan
(74) *Attorney, Agent, or Firm* — Morgan, Lewis & Bockius LLP

(57) ABSTRACT

Embodiments of the present invention provide systems and methods for recovering a high availability storage system. The storage system includes a first layer and a second layer, each layer including a controller board, a router board, and storage elements. When a component of a layer fails, the storage system continues to function in the presence of a single failure of any component, up to two storage element failures in either layer, or a single power supply failure. While a component is down, the storage system will run in a degraded mode. The passive zone is not serving input/output requests, but is continuously updating its state in dynamic random access memory to enable failover within a short period of time using the layer that is fully operational. When the issue with the failed zone is corrected, a failback procedure brings the system back to a normal operating state.

20 Claims, 7 Drawing Sheets

(56) References Cited

U.S. PATENT DOCUMENTS

| | | | | |
|---|---|---|---|---|
| 2003/0041201 A1* | 2/2003 | Rauscher | ............ | G06F 11/2089 710/300 |
| 2007/0234118 A1* | 10/2007 | Sardella | ............. | G06F 11/0727 714/23 |
| 2008/0028238 A1* | 1/2008 | Lucas | ....................... | G06F 1/26 713/300 |
| 2008/0062634 A1* | 3/2008 | Elliott | ................... | G06F 3/0607 361/679.37 |
| 2011/0185099 A1* | 7/2011 | Stuhlsatz | .................. | G06F 1/26 710/302 |
| 2013/0103329 A1* | 4/2013 | Armstrong | ............. | G06F 11/07 702/59 |
| 2015/0370666 A1* | 12/2015 | Breakstone | ........... | G06F 3/0685 714/6.3 |
| 2017/0286243 A1* | 10/2017 | Breakstone | ......... | G06F 11/2012 |
| 2017/0300445 A1* | 10/2017 | McKnight | ........... | G06F 13/4027 |
| 2017/0315724 A1* | 11/2017 | Colgrove | ................ | G06F 3/061 |
| 2018/0024743 A1* | 1/2018 | Herman | ................ | G06F 3/0604 |

\* cited by examiner

HIGH AVAILABILITY STATE MACHINE AND RECOVERY

FIELD

Embodiments of the present invention generally relate to the field of data storage systems. More specifically, embodiments of the present invention relate to high availability storage systems capable of recovering from a controller failure.

BACKGROUND

Data storage systems generally store data on one or more blades and may rely on a single storage controller to control read and write operations to the blade or blades. When the controller or related components fail, the data storage system is unable to recover to a ready or active state without significant time and effort of the system administrators, and the system may be unavailable for a long period of time. A dual-controller system may be used to enable recovery from such a failure; however, there is difficulty in transitioning storage elements from one controller to another. What is needed is a dual-controller data storage system that can manage the states of multiple storage elements, controllers, and other components, and quickly and easily transition to a second controller in the case of failure.

SUMMARY

Methods and devices for recovering a high availability storage system are disclosed herein. The storage system includes a first layer and a second layer, each layer including a controller board, a router board, and storage elements. When a component of a layer fails, the storage system continues to function in the presence of a single failure of any component, up to two storage element failures in either layer, or a single power supply failure. While a component is down, the storage system will run in a degraded mode. The passive zone is not serving input/output (IO) requests, but is continuously updating its state in dynamic random-access memory (DRAM) to enable failover within a short period of time using the layer that is fully operational. When the issue with the failed zone is corrected, a failback procedure brings the system back to a normal operating state.

According to one embodiment, a storage system is disclosed, including a first layer having a first controller board, a first router board, and a first plurality of local storage elements, a second layer having a second controller board, a second router board, and a second plurality of local storage elements, and a midplane connecting the first layer and the second layer. The midplane is connected to a first power supply of the first layer and a second power supply of the second layer. The first layer accesses the second plurality of local storage elements using the midplane, and the second layer accesses the first plurality of local storage elements using the midplane.

According to another embodiment, a method of transitioning a degraded layer of a storage system to an active state is disclosed. The method includes attempting to boot a first layer and a second layer of the storage system to a quiescent state, where the first layer comprises a first local zone and a first remote zone, and the second layer comprises a second local zone and a second remote zone, and determining that the first layer booted successfully, and the second layer has failed due to an issue, where the second local zone and the second remote zone are in a down state. The method includes performing a failover procedure from the second local zone to the first remote zone, where the first remote zone transitions to an active state, and when the issue of the second layer has been corrected, booting the second layer, where the second local zone and the second remote zone transition to the quiescent state. The method also includes transitioning the second local zone and the second remote zone to a passive state, and performing a failback procedure from the first remote zone to the second local zone, wherein the first remote zone enters an active-quiescent state.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
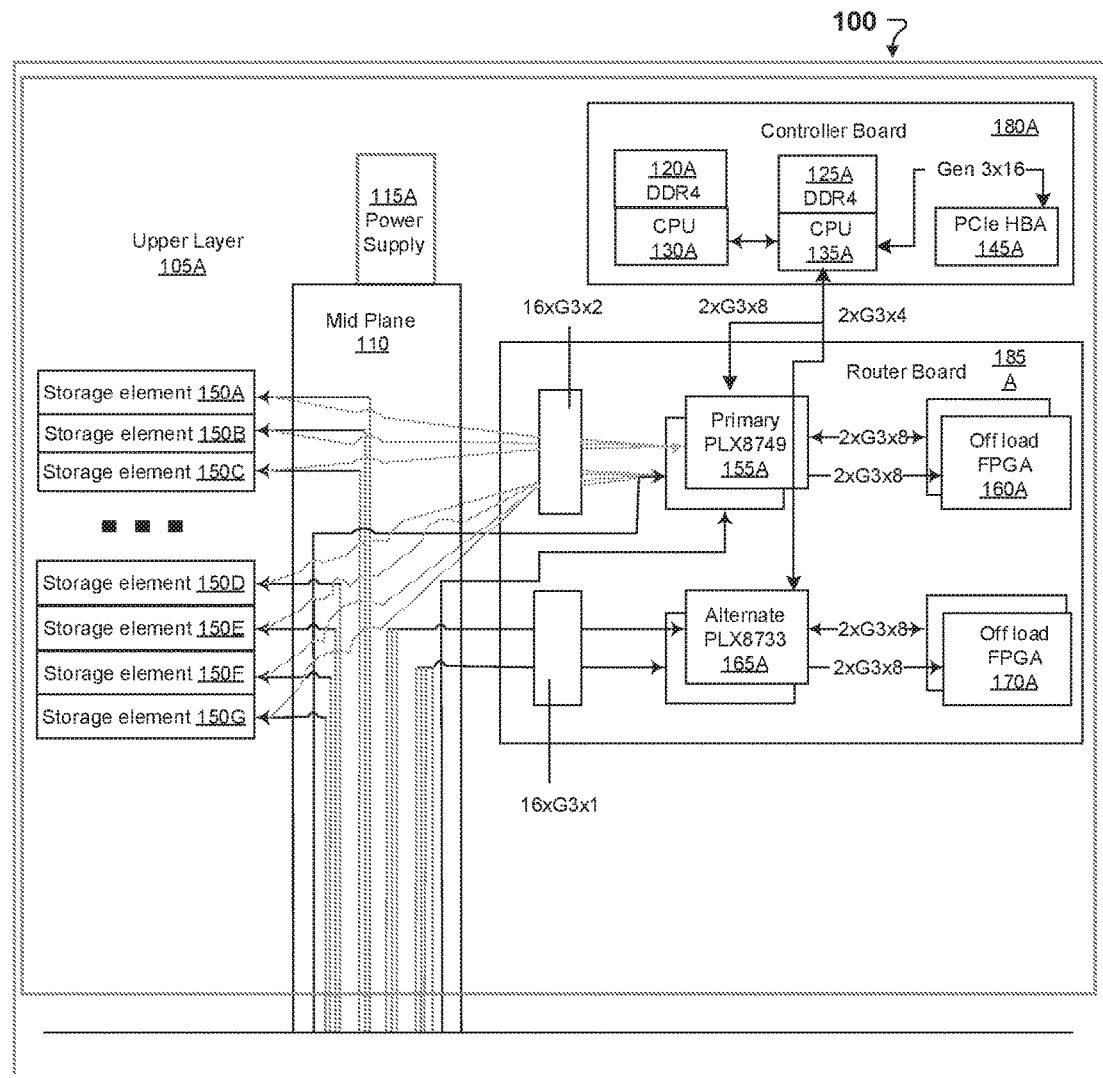
FIG. 1A is a block diagram of an upper portion of an exemplary data storage system 100 depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail so as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

High Availability State Machine and Recovery

The following description is presented to enable a person skilled in the art to make and use the embodiments of this invention. It is presented in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Figure 1B:
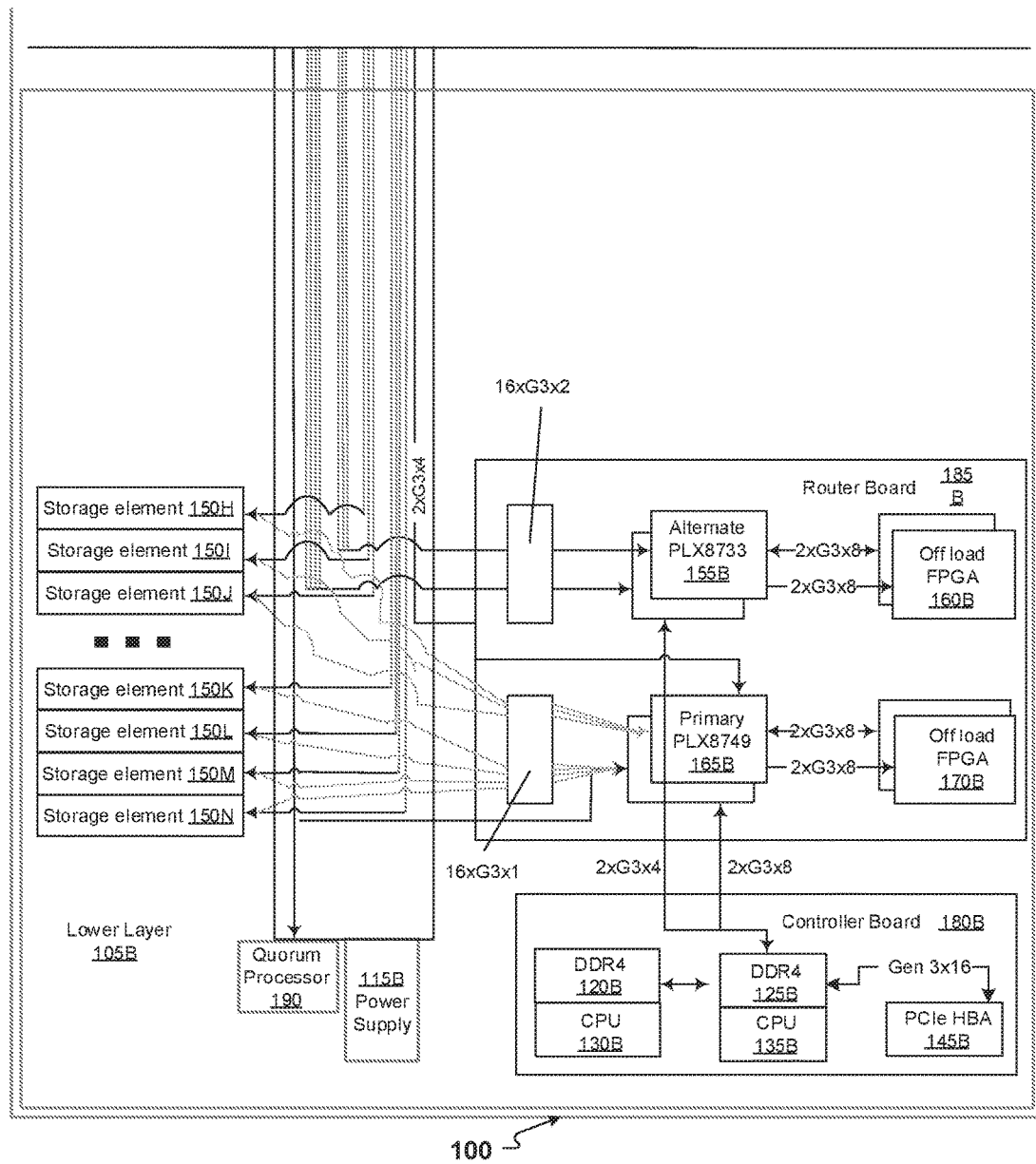
FIG. 1B is a block diagram of a lower portion of the exemplary data storage system 100 of FIG. 1A depicted according to embodiments of the present invention.

With regard to FIGS. 1A and 1B, a block diagram of an upper portion (FIG. 1A) and a block diagram of a lower portion (FIG. 1B) of an exemplary data storage system 100 are depicted according to embodiments of the present invention. FIG. 1A includes upper layer 105A of data storage system 100, and FIG. 1B includes lower layer 105B of data storage system 100. Many components depicted in FIG. 1A are connected to components depicted in FIG. 1B, as described below.

Data storage system 100 includes an upper layer 105A and a lower layer 105B, and the layers have a controller board, a router board, and a plurality of storage elements (e.g., flash storage). The layers 105A and 105B are connected by a midplane 110 that routes signals from the router boards to storage elements of a local zone and a remote zone. Two power supplies 115A and 115B are attached directly to the midplane 110 for supplying power to the layers 105A and 105B, respectively.

The data storage system 100 is accessible by servers and client computers using a network such as Ethernet, Fibre Channel, InfiBand, etc. The data storage system 100 includes controller boards 180A and 180B for layer 105A and layer 105B, respectively, and the controller boards include a central processing unit (CPU) 130A and 130B, respectively. CPUs 130A and 130B are used as control CPUs and may comprise a Xeon server CPU with multiple CPU cores (e.g. 4, 8, or 12 cores), for example. External hosts may be routed to the Upper Layer 105A or the Lower Layer 105B. Traffic from each layer is routed to the storage elements of the appropriate layer. Alternate Routers 165A and 155B are typically idle, and can be used for purposes other than reading and writing traffic. When a controller or router of a layer fails, the request or requests which were previously routed to the failed layer are routed to the controller board of the other layer, and the alternate routers (e.g., router 155B and 165A), alternate offload engines (160B and 170A), and backplane connections are used to route data to the storage elements of the active layer.

The controller boards 180A and 180B also include a Peripheral Component Interconnect Express (PCIe) network interface 145A and 145B, respectively, for connecting hosts to the layer of the storage system, where the hosts send reads and writes using the PCIe network interfaces. The storage elements 150A-150N may comprise non-volatile storage, such as flash memory, for storing and retrieving data. The CPUs 130A and 130B have a plurality of dynamic random access memory interfaces for supporting a large amount of DRAM 120A and 120B, respectively. CPU DRAM is accessible by the offload field-programmable gate arrays (FPGAs) (and optionally the storage elements) using the PCIe interface. The offload FPGAs 160A and 160B are connected to the PCIe Switch enabling the offload FPGA to access any of the storage elements, as well as the CPU DRAM of the controllers. Controller boards 180A and 180B may optionally comprise a second CPU-DRAM pair, specifically CPU 135A and DDR4 125A, and CPU 135B and DDR4 125B, respectively. According to some embodiments, the storage elements comprise flash memory cartridges housing a plurality of flash memory units.

The control CPUs 130A and 130B (and optionally CPUs 135A and 135B) execute instructions of a Flash Translation Layer (FTL), including a simplified set of Flash related commands for the storage elements 150A-N. Wear leveling, map table management, garbage collection, and other management functions typically performed by a solid state drive (SSD) are performed by software executed by a control CPU. Thus, according to some embodiments, the storage elements implement only a small set of commands, such as read, program, and erase, for example.

When a component of a layer (e.g., a controller or router board) fails, the storage system 100 will continue to function in the presence of a single failure of any component, up to two storage element failures in either layer, or a single power supply failure. While a component is down, the storage system 100 will run in a degraded mode. The degraded mode may have performance or reliability limitations that are not present when the system is running at full capacity.

The storage system 100 may optionally include a quorum processor 190 and can recover from failure of the quorum processor 190. The quorum processor may be used as an additional processor shared by both layers to support the distributed storage and management of the system's configuration data. For example, to resolve conflicts among nodes, the management software may identify a majority of nodes having the same configuration information using the quorum processor. The quorum processor may also be used for other functions in the system, such as the initialization of security modules. According to some embodiments, the quorum processor may be accessed by both layers using the midplane.

Figure 2:
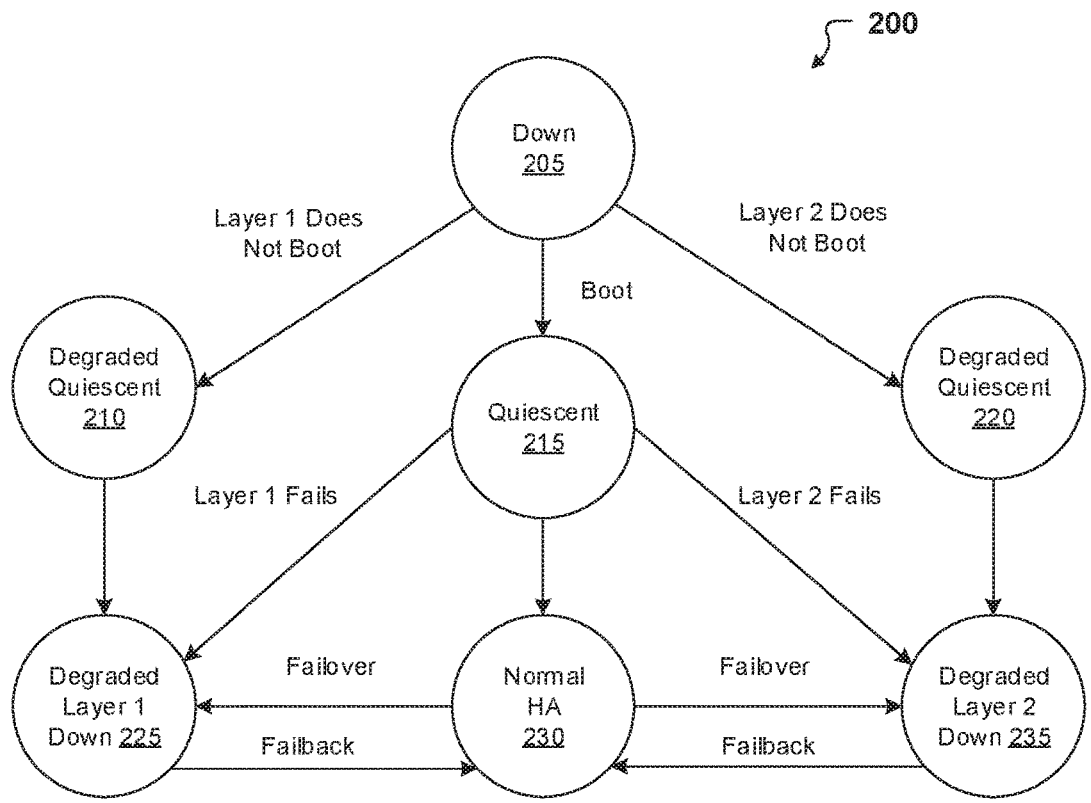
FIG. 2 is a state diagram 200 depicting states of the layers of an exemplary storage system from the perspective of a controller board according to embodiments of the present invention.

With regard to FIG. 2, state diagram 200 depicts exemplary states of layers of a storage system from the perspective of a controller board according to embodiments of the present invention. The layers of the storage system may exist in one state at a time. Initially, the storage system is in a down state (205). Subsequently, an attempt is made to boot a first layer (Layer 1) and a second layer (Layer 2) of the storage system. When Layer 1 does not boot, the storage system enters a degraded quiescent state (210). In this state, the modules of the storage system are running, but Layer 1 is not accepting or processing control requests from the management kernel module. When both layers boot successfully, the system enters a quiescent state (215), where the modules of the storage system are running, and both layers are accepting and processing control requests from the management kernel module. When Layer 2 does not boot, the storage system enters a degraded quiescent state (220). In this state, the modules of the storage system are running, but Layer 2 is not accepting or processing control requests. A management kernel module is executed by the CPU of the controller boards to provide Input/Output control (IOCTL) application programming interfaces (APIs) used to check the state of the system, change the system state, check the zone state (e.g., quiescent, passive, active, in transition), and change the zone state.

When the system is in state 210 with Layer 1 being down, or in state 215 and Layer 1 fails, the storage system operates in a degraded state (225). When the system is in state 220 and Layer 2 is down, or in state 215 and Layer 2 fails, the system operates in a degraded state (235). When the storage system operates in a degraded mode, the storage system may have performance or reliability limitations that are not present when the system is running at full capacity. When both layers are operating normally, the system operates in a normal mode (230), where no performance or reliability limitations are present. Subsequently, failover may occur, and the storage system enters a degraded mode (225 or 235). It is possible for the system to recover and failback to the normal operating mode (230).

Figure 3:
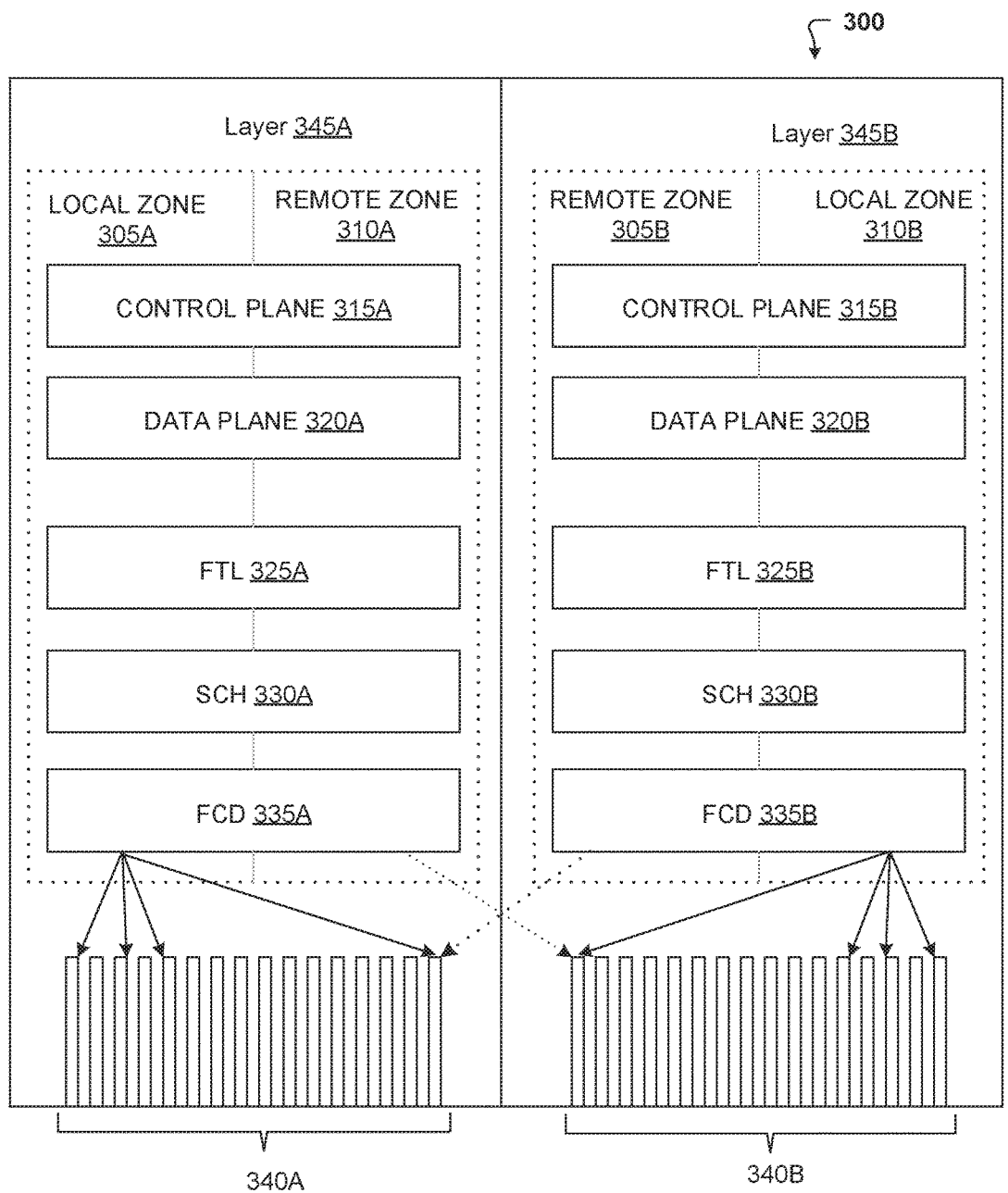
FIG. 3 is a block diagram depicting hardware and software elements of the layers of an exemplary storage system 300 according to embodiments of the present invention.

With regard to FIG. 3, hardware and software elements of the layers of an exemplary storage system 300 are depicted according to embodiments of the present invention. Modules in the software stack, such as flash translation layer (FTL) 325A and 325B, scheduler (SCH) 330A and 330B, and flash control driver (FCD) 335A and 335B are executed by the storage system and configured to support the concept of individual zones. The modules can process requests related to a local zone working with storage elements in the local layer, or a remote zone working with storage elements of the remote layer. Layer 345A includes local zone 305A and remote zone 310A, and Layer 345B includes remote zone 305B and local zone 310B. Storage elements 340A are included in Layer 345A as local storage elements, and storage elements 340B are included in Layer 345B as local storage elements. Storage elements 340A are considered to be in the remote zone 305B of Layer 2, and storage elements 340B are considered to be in the remote zone 310A of Layer 1.

Layer 345A and Layer 345B further include a control plane 315A and 315B, and a data plane 320A and 320B, respectively. The control planes are informed of the state of the system, potential issues, hardware failures, etc. The controller boards evaluate the state information and make changes to the states of the modules and the zones (e.g., the local zone and remote zone) accordingly.

Several distinct write paths are used to write data to offload FPGAs and flash storage locations. A system band (SB) is used for writing map/page data, and a Sub-4 k band is used for writing data that is less than 4 kb in size. Internal bands (IBs) are used for writing all metadata. Data may be categorized into hot data that is frequently accessed (e.g., normal write requests from users and user apps) and cold data (e.g., old data that is rewritten during garbage collection). The system uses two dedicated hot bands for writing hot data to the flash storage, and two dedicated cold bands for writing cold data to the flash storage. In some cases, an internal band accumulation buffer (e.g., a scratchpad) provided by offload FPGA is used to accumulate metadata delta-writes (LURs) into a page that is eventually written into internal band. The FPGA is capable of replicating (mirroring) the contents of the scratchpads to the DRAM on the other layer. As discussed below, a stripe is a collection of flash pages, typically one per storage element, where two pages are selected to hold the redundant array of independent disks (RAID) parity of data written to all the other pages. When any two data pages are lost due to failure of corresponding storage elements, the data pages can be recovered using the parity.

The services performed by the management kernel module include:
Provide IOCTL APIs to the control plane for:
  a. Checking the state of the system
  b. Changing the state of the system
  c. Checking the zone state (e.g., quiescent, passive, active, and in transition)
  d. Changing the zone state
Communicate with the management kernel module of the other layer to implement the protocols needed to facilitate particular state transitions.
Communicate with FTL module to:
  a. Check the zone state in FTL (e.g., quiescent, passive, active, and in transition)
  b. Change the zone state in FTL In some cases, the FTL will pass the requests to the SCH and/or the FCD to complete a task. For example, a change state request may be passed to underlying modules to reinitialize threads, stop the threads, reconfigure modules, etc., depending on what is expected in a particular state.

The state transitions of the zones occur in a coordinated fashion, where some state transitions are only possible at a specific time or under certain conditions. For example, the transition from quiescent to passive is allowed to occur when the other layer is already in an active state. The controller board issues state transition requests into the FTL using the data plane, making sure that other modules (in the local layer and the remote layer) meet the requirements of the transition.

Figure 4:
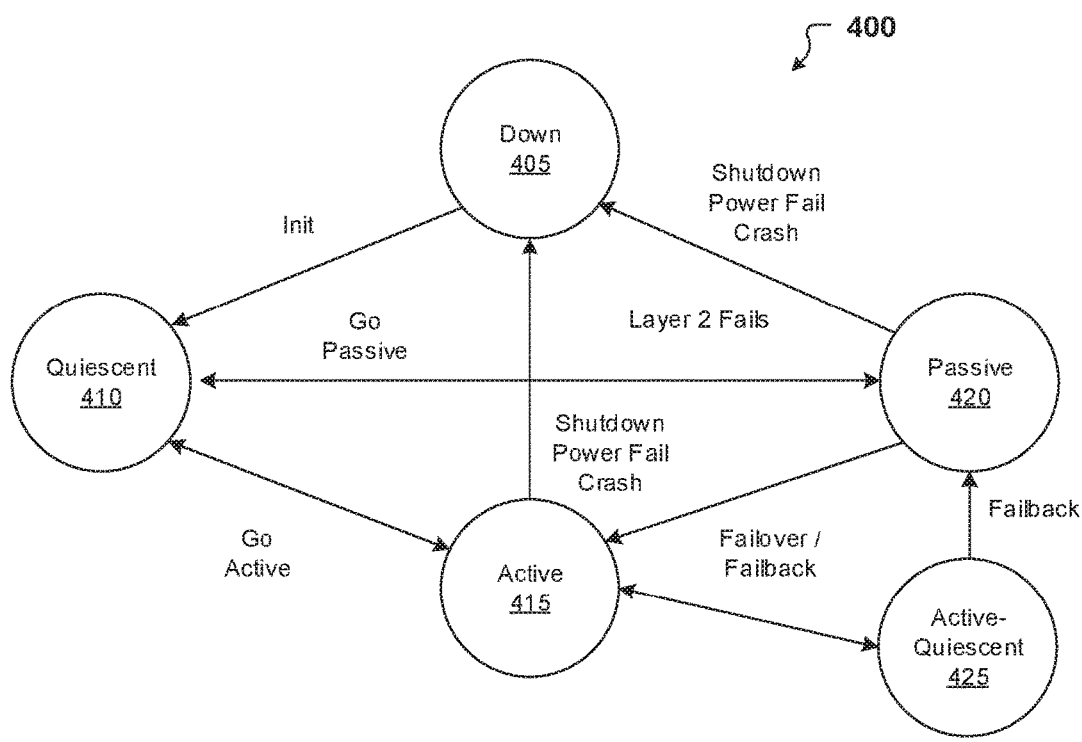
FIG. 4 is a state diagram 400 depicting states of a layer of an exemplary storage system according to embodiments of the present.

The management kernel module of one layer will communicate with the management kernel module of the other layer to exchange any additional information needed to perform particular state transitions. With regard to FIG. 4, a state diagram 400 of an exemplary layer of a storage system is depicted according to embodiments of the present invention. A zone may be in one of five stable states:

Down (405)—one or more of the modules of the zone are not running

Quiescent (410)—the modules of the zone are running, but the zone is not accepting or processing any input/output (IO) requests Active (415)—the zone is running in active mode (serving IO requests)

Passive (420)—the zone is running in a passive mode (not serving IO requests), but is continuously updating its state in DRAM to enable failover within a short period of time (e.g., 10 seconds or less).

Active-Quiescent (425)—the zone is not accepting or processing any IO requests, but is maintaining the latest DRAM state from the time it was Active in order to quickly transition to a passive state.

Figure 5:
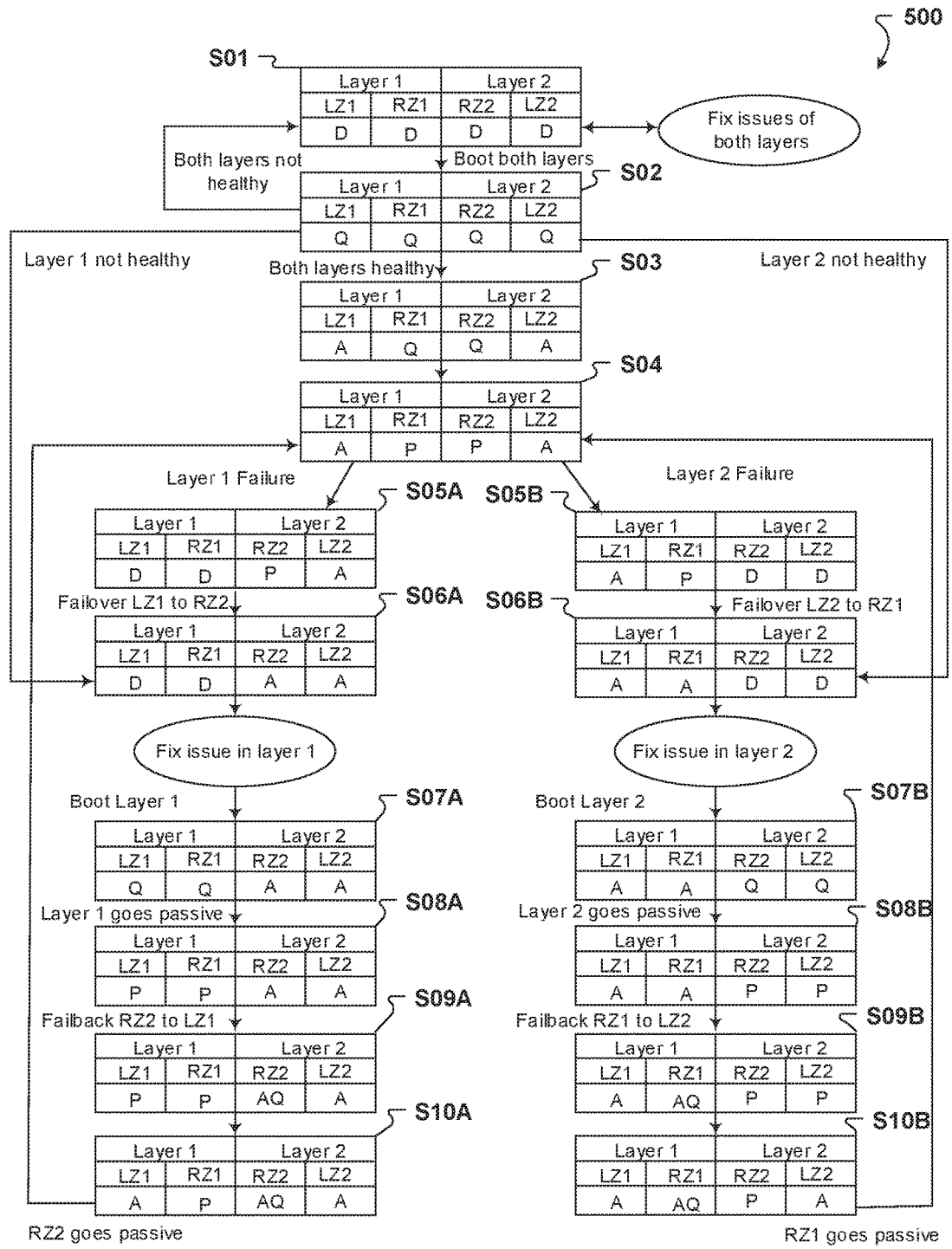
FIG. 5 is a state diagram 500 of an exemplary storage system depicted from the perspective of a management kernel module according to embodiments of the present invention.

A zone can also temporarily operate in one of 11 transient states:

Down2Quiescent—the zone is booting/initializing
Quiescent2Active—the zone is going active
Quiescent2Passive—the zone is going passive
Active2Down—the zone is shutting down
Passive2Down—the zone is shutting down
Passive2Active—the remote zone is in failover or the local zone is in failback
Active2Quiescent—the zone is going quiescent
Passive2Quiescent—the zone is going quiescent
Active2ActiveQuiescent—the active zone is going quiescent, while storing state information in DRAM
ActiveQuiescent2Passive—during failback
ActiveQuiescent2Active—when failback fails With regard to FIG. 5, a state diagram 500 of an exemplary storage system is depicted from the perspective of a management kernel module according to embodiments of the present invention. The storage system operates using four different zones: Zone 1 Local Zone (LZ1), Zone 1 Remote Zone (RZ1), Zone 2 Remote Zone (RZ2), and Zone 2 Local Zone (LZ2). In state S01, the zones of both Layer 1 and Layer 2 are down, and any issues of the layers are fixed. An attempt is made to boot both layers and transition to state S02. If both layers are unhealthy, the system remains in state S01, and the issues of both layers are addressed.

When both layers are healthy and boot successfully, at state S02, the local and remote zones of Layer 1 and Layer 2 are in a quiescent state. If both layers remain healthy, at state S03, LZ1 and LZ2 enter an active state, and RZ1 and RZ2 remain in a quiescent state. If one of the layers is not healthy, at S02, the system moves to S06A (when Layer 1 is not healthy) or S06B (when Layer 2 is not healthy). In S06A and S06B, the zones of the healthy layer are active, the zones of the unhealthy layer are down, and an attempt is made to fix the issues with the unhealthy layer. When both layers are healthy at S03, the system moves to state S04, where RZ1 and RZ2 move from a quiescent state to a passive state. At this time, if Layer 1 fails, the system moves to S05A, and if Layer 2 fails, the system moves to S05B, where both zones of the failed layer are down. The system transitions to S06A when Layer 1 has failed, or S06B when Layer 2 has failed, and an attempt is made to fix the issues with the failed layer. In S06A, failover is performed from LZ1 to RZ2, and in S06B, failover is performed from LZ2 to RZ1.

Subsequent to the failover of S06A, when an issue with Layer 1 has been fixed, Layer 1 is booted, and the system moves to S07A. LZ1 and RZ1 are in a quiescent state, and RZ2 and LZ2 remain active. At state S08A, LZ1 and RZ1 transition to a passive state. At S09A, the system performs failback of RZ2 to LZ1, and RZ2 transitions to an active-quiescent state. At S10A, LZ1 transitions to an active state. The system then transitions to S04, where RZ2 goes passive, and the system is in a healthy state with both layers having an active zone and a passive zone.

Subsequent to the failover of S06B, when an issue with Layer 2 has been fixed, Layer 2 is booted, and the system moves to S07B. RZ2 and LZ2 are in a quiescent state, and LZ1 and RZ1 remain active. At state S08B, RZ2 and LZ2 transition to passive. At S09B, the system performs failback of RZ1 to LZ2, and RZ1 transitions to active-quiescent. At S10B, LZ2 transitions to an active state. The system then transitions to S04, where RZ1 goes passive, and the system is in a healthy state with both layers having an active zone and a passive zone.

For transitions of individual zones, some transitions use the management kernel module to coordinate between the zones and ensure that certain requirements are satisfied. According to some embodiments, transitions involving a down state may require that both zones of a layer make the same transition from a down state, or to a down state, at the same time. For example, the system should shut down, crash, or boot both zones at the same time. In addition to the platform's standard boot procedure, the system or modules perform the following additional steps for transitions involving a down state:

1. Startup FCD, SCH, FTL modules in order
2. Reserve system DRAM and allocate pools and other data structures needed by the modules Transition from a quiescent state to a passive state may require that the other side is already in an active mode, as there will be information exchanged between the active side and the zone transitioning from quiescent to passive. Table I describes the transition from quiescent to passive in detail.

TABLE I

| Layer 1 Local Zone (Active Side) | Layer 2 Remote Zone (From Quiescent to Passive) |
|---|---|
| | Initialize FTL module including data structures allocated during boot procedure, optionally creating threads, request Active Side to prepare for transition and provide a list of metadata flash blocks (internal band and sub band) to process |
| Prepare to support the transition in Layer 2: Garbage Collection of system band metadata flash blocks, if more system band metadata flash blocks were allocated than are needed for desired over-provisioning Prevent System Garbage Collection on system band metadata flash blocks that have not yet been processed by the other side Prepare an ordered list of system band metadata flash blocks to be processed by the other side Perform internal band group switch, where all internal | |

TABLE I-continued

| Layer 1 Local Zone (Active Side) | Layer 2 Remote Zone (From Quiescent to Passive) |
|---|---|
| band metadata structures are fully written into a new group of flash blocks (see Table II) Prevent erasing of internal band metadata flash blocks after next group switch until they are processed by the other side Prepare an ordered list of internal band metadata flash blocks to be processed by the other side Send the list of internal band metadata flash blocks and system band metadata flash blocks to the other side | |
| | Process internal band metadata flash blocks to build DRAM data structures covered by the internal band. After a block is processed, notify the other side. |
| When notified about additional internal band metadata flash block having been processed, allow it to be erased if another group switch occurs | |
| | Process system band metadata flash blocks to build a Map Index in DRAM. Use the information in sub band bitmap loaded from the internal band. After a system band metadata flash block is processed, notify the other side for garbage collection |
| When notified about an additional system band metadata flash block having been processed, allow its garbage collection | |
| | When all listed metadata flash blocks are processed: Ask the active side to start replicating (mirroring) hot band write buffers and accumulation buffers (e.g., scratchpads) to the passive side. Wait for confirmation. |
| Start replicating (mirroring) hot band write buffers and internal band write buffers and accumulation buffers (e.g., scratchpads) to the passive side. Pad and flush a current stripe in hot bands and internal bands. When all the flushed stripes are confirmed to be programmed to flash, confirm to the passive side that the replicating (mirroring) has started | |
| | Switch to Continuous Sync procedure |

Continuous Sync is a procedure executed in a zone that is in a passive state. The active zone continues sending information about new metadata flash blocks which will be processed on the passive side by reading a metadata flash blocks digest, determining which flash pages contain updates of existing data (e.g., delta-writes or live update requests (LURs)), and replaying those flash pages. Some items may be missing from the LURs that are used to correctly build the map index. The LURs carry reverse map information, and the LURs are extended with forward map information for use in the sync procedure. The continuous sync procedure is described in detail in Table II.

TABLE II

| Layer 1 Local Zone (Active Side) | Layer 2 Remote Zone (Passive, performing Continuous Sync) |
|---|---|
| | Request Active Side to start sending information about new metadata flash blocks (internal band) |
| Prevent erasing of metadata flash blocks after the Group Switch until they are processed by the passive side. When a new metadata flash block is written, send the related info to the passive side. | |
| | Process metadata flash blocks by reading the metadata flash blocks digest, determine which flash pages contain LURs, and replay the flash pages having LURs. After a metadata flash block is processed, notify the other side. |
| Process the notification, allow processed metadata flash blocks to be erased after the group switch. Repeat the previous step to submit another metadata flash block after writing. | |

In a failover case, when transitioning from passive to active, it is assumed that the other side is in a quiescent or down state. The passive to active failover procedure is described in Table III.

TABLE III

| # | Passive to active failover procedure |
|---|---|
| 1 | Recover the internal band (IB) |
| 1a | Replay the IB metadata flash blocks until the last fully programmed stripe |
| 1b | Look for the root of a digest at the end of last fully programmed stripe in the last IB metadata flash block. If the root is missing due to write offload engine (WOE) failure: Replay all mirrored internal band write buffers in the mirrored write buffers pool (in order) having an input/output identification larger than the IO/ID of the last successfully replayed flash page in the IB metadata flash blocks Replay all mirrored IB Scratchpads (e.g., accumulation buffers) if the IB Scratchpad content has not been already replayed in the previous steps At this point, all the memory structures backed by IB are up to date |
| 1c | Perform IB group switch procedure: A full copy of all memory structures backed by IB are written to new IB metadata flash blocks Discard the previous IB metadata flash blocks, including the last one that was partially written (and corrupt in the case of WOE crash) |
| 2 | Recover the system band A healthy system band (SB) is used for flushing dirty map pages (a product of replaying hot and Sub-4k bands). |
| 2a | Look for the root of a digest at the end of the last fully programmed stripe in the last system metadata. If the root is missing due to WOE failure: Assign a new erased metadata flash block to the system band Rewrite all valid map pages between the start of the corrupt system band metadata flash block and the end of last fully programmed stripe, to the new system band metadata flash block. Update the Map Index in DRAM to point to the rewritten pages. Use the bitmap to determine which map pages are valid, and optionally crosscheck the validity using a lookup in the Map Index. Discard the original, corrupt system bad metadata flash block There may be map pages that could not be rewritten due to unfinished pages in the last few stripes. In this case, the Map Index should point to previous versions of these map pages that are still readable from somewhere else in flash. |

TABLE III-continued

| # | Passive to active failover procedure |
|---|---|
| 2b | There may be flash page entries that are missing in the Map. The missing map pages should all be recovered by replaying the hot bands and Sub-4k band as described in the steps below. |
| 3 | Replay hot bands from the replay pointer to the last fully programmed stripe<br>Do not replay the last data pages if they belong to the IO that is incomplete<br>The data pages in hot bands should have ascending IO/IDs in each band |
| 3a | Look for the root of a digest at the end in the last fully programmed stripe in hot band flash blocks. If the root is missing due to WOE failure:<br>Replay all mirrored hot band write buffers in the mirrored write buffers pool (in the order of IO/ID) having IO/ID larger than the IO/ID of the last successfully replayed data pages in the hot band flash block<br>Do not replay the last data page if it belongs to an IO that is incomplete |
| 4 | Replay Sub-4k Band from the replay pointer to the last fully programmed stripe<br>Perform the data page read check to determine if Sub-4k segment needs to be replayed<br>The data pages in the Sub-4k band will have ascending IO/IDs |
| 4a | Look for the root of a digest at the end of the last Sub-4k band flash block. If the root is missing:<br>Replay all mirrored Sub-4k band write buffers in the mirrored write buffers pool (in the order of IO/ID) having IO/ID larger than IO/ID of the last successfully replayed data page in the Sub-4k band flash block |
| 5 | Flush all dirty map pages from DRAM into the system band. This step finalizes the recovery of all data written to flash<br>Discard the original set of Sub-4k band flash block including the last one that may be corrupt. |
| 6 | For the hot bands and cold bands<br>Look for the root of a digest at the end of the last fully programmed stripe in the last band's flash block. If the root is missing due to WOE failure:<br>Assign a new flash block to the band<br>Rewrite all valid flash pages between the start of the corrupt flash block and the end of last fully programmed stripe, to the new flash block. Update the Map to point to the rewritten pages. Check the validity of the parsed out data pages by making a data page lookup using the Map.<br>Discard the original, corrupt flash block |

Figure 6:
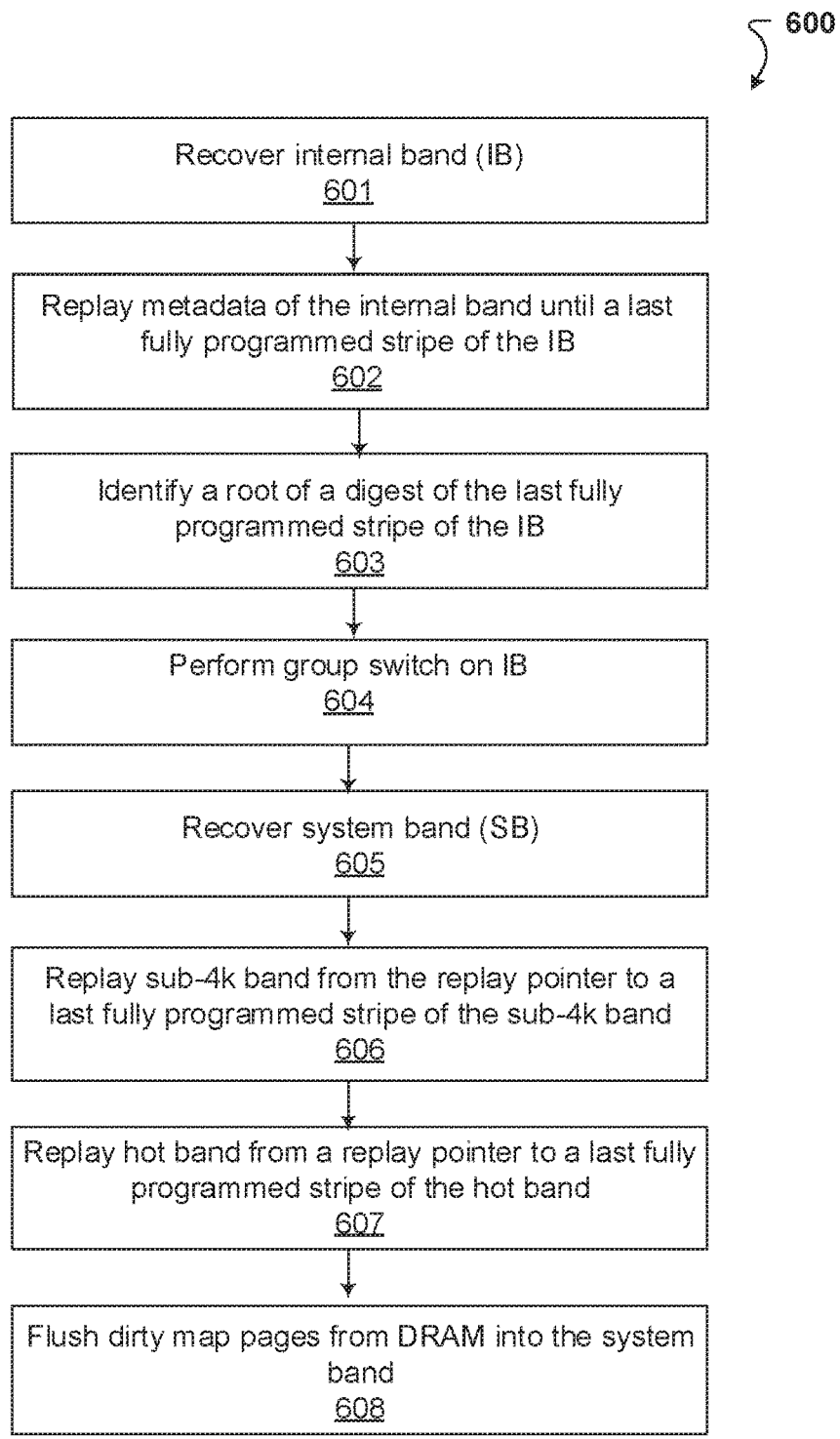
FIG. 6 is a flow chart depicting an exemplary sequence of computer implemented steps for performing passive to active failover in a storage system according to embodiments of the present invention

FIG. 6 is a flow chart 600 depicting an exemplary sequence of computer implemented steps for performing passive to active failover of a storage system according to embodiments of the present invention. At step 601, the internal band of the storage system is recovered. At step 602, the metadata of the internal band is replayed until the last fully programmed stripe of the internal band. An attempt is made to identify the root of the digest of the last fully programmed stripe of the internal band at step 603. At step 604, a group switch is performed on the internal band. At step 605, the system band of the storage system is recovered. At step 606, a sub-4 k band of the storage system is optionally replayed from the replay pointer to a last fully programmed stripe of the sub-4 k band. At step 607, a hot band of the storage system is optionally replayed from a replay pointer to a last fully programmed stripe of the hot band. At step 608, the dirty map pages of the map table are flushed from DRAM into the system band.

According to some embodiments, the API provided by the management kernel module includes the following commands:

Get System State (GET_SYSTEM_STATE)
    Allows any zone to check the state of the counterpart zone on the other side.
    Response: State of the system
    Possible errors: SYSTEM_STATE_UNKNOWN—this management kernel module is not capable of determining the system state Get Zone State (GET_ZONE_STATE)
    Allows any zone to check the state of the counterpart zone on the other side.
    Parameters: ZONE_ID
    Response
        State of the zone
        Possible errors: INVALID_ZONE Change State Begin (CHANGE_STATE_BEGIN)
    Asks the other side to prepare for a state transition on this side. For example, the zone that is going to change from quiescent to passive will ask the zone on the other side (which must be already active) to prepare for this transition. The active zone performs a series of preparation steps and sends a list of metadata flash blocks for this side to process.
    Codes:
        Requesting zone current state
        Requesting zone future state
    Response
        State of the zone
        Status/Error Code Metadata Flash block Info (SBLOCK_INFO)
    Command used to send metadata flash block information to the zone on the other side. Metadata flash block information for all IB and SB metadata flash blocks will be needed for transitioning from quiescent to passive, and metadata flash block information about new IB metadata flash blocks will be needed in a passive state.
    Code: Metadata Flash Block Information
    Response: Status/Error Code Metadata Flash Block Processed (SBLOCK_PROCESSED)
    Command used to notify the active zone that the passive zone has processed another metadata flash block. The active zone can lift the restriction on garbage collecting this metadata flash block.
    Code: S-Block Information Change State End (CHANGE_STATE_END)
    Notifies the other side about finishing a state transition on this side. The notified zone may clean up the state supporting the transition on the other side and lift all restrictions related to the transition (e.g., garbage collection or erase restrictions).
    Code
        Notifying zone current state
        Notifying zone previous state
    Response: Status/Error Code Flash page Replication Control (LPAGE_REPLICATION_CONTROL)
    Command used to notify the active zone that the other side is about to enter the passive state. Active zone needs to start replicating the hot flash pages, as well as the scratchpads.
    Code: Operation: Start=1, Stop=2
    Response: Possible errors: INVALID_OPERATION, TIMEOUT The control plane API of the management kernel module can execute several commands. The following exemplary code descriptions demonstrate zone structures, states, and an exemplary API implementation:

```
enum common_zone_type_t
{
    COMMON_ZONE_TYPE_LOCAL = 0,
    COMMON_ZONE_TYPE_REMOTE = 1
};
struct common_zone_t
{
    int zone_id;
    enum common_zone_type_t type;
    void* zone_priv;
    .
    .
    .
};
enum common_zone_shutdown_method
{
COMMON_ZONE_METHOD_SHUTDOWN = 0,
COMMON_ZONE_METHOD_POWER_FAIL = 1,
COMMON_ZONE_METHOD_CRASH = 2
};
enum common_zone_event
{
COMMON_ZONE_EVENT_ENUMERATED = 0,
COMMON_ZONE_EVENT_ADDED = 1,
COMMON_ZONE_EVENT_REMOVED = 2,
COMMON_ZONE_EVENT_STATE_CHANGED = 3
};
enum common_zone_state
{
COMMON_ZONE_STATE_DOWN = 0,
COMMON_ZONE_STATE_QUIESCENT = 1,
COMMON_ZONE_STATE_ACTIVE = 2,
COMMON_ZONE_STATE_PASSIVE = 3
};
enum common_zone_error_status
{
COMMON_ZONE_ERROR_STATUS_OK = 0,
COMMON_ZONE_ERROR_STATUS_INVALID_ZONE = 1,
COMMON_ZONE_ERROR_STATUS_INVALID_LOCAL_STATE = 2,
COMMON_ZONE_ERROR_STATUS_INVALID_REMOTE_STATE = 3,
COMMON_ZONE_ERROR_STATUS_OTHER_ERROR = 4
};
typedef void common_zone_notification_callback_f(struct
common_zone_t* zone, enumcommon_zone_event event);
int
common_set_zone_notification_callback(common_zone_notification_callback
_f*callback)
typedef void common_zone_callback_f(enum common_zone_error_status
status, void* private_p);
int common_zone_init(struct common_zone_t* zone, void* private_p,
common_zone_callback_f* callback);
int common_zone_shutdown(struct common_zone_t* zone, enum
common_zone_shutdown_method
method, void* private_p, common_zone_callback_f* callback);
int common_zone_change_state(struct common_zone_t* zone, enum
common_zone_state
state, void* private_p, common_zone_callback_f* callback);
int common_zone_get_state(struct common_zone_t* zone, enum
common_zone_state*
state_p);
```

Embodiments of the present invention are thus described. While the present invention has been described in particular embodiments, it should be appreciated that the present invention should not be construed as limited by such embodiments, but rather construed according to the following claims.

What is claimed is:

1. A storage system, comprising:
a first layer comprising a first controller board, a first router board, and a first plurality of local storage elements;
a second layer comprising a second controller board, a second router board, and a second plurality of local storage elements; and
a midplane connecting the first layer and the second layer, wherein:
the midplane is connected to a first power supply, wherein the first power supply is configured to supply power to the first layer without supplying power to the second layer,
the midplane is connected to a second power supply, wherein the second power supply is configured to supply power to the second layer without supplying power to the first layer,
the first layer is configured to access the second plurality of local storage elements using the midplane, and
the second layer is configured to access the first plurality of local storage elements using the midplane.

2. The storage system of claim 1, wherein the storage system is configured to:
- boot the first and second layer in a quiescent state;
- determine that a failed layer is operating in a degraded state; and
- perform a failback process to recover the failed layer to an active state.

3. The storage system of claim 2, wherein each of the first controller board and the second controller board comprises a processor configured to execute instructions of a flash translation layer (FTL) to perform at least one of: wear leveling, map table management, and garbage collection.

4. The storage system of claim 3, wherein the processor comprises multiple cores.

5. The storage system of claim 2, wherein each of the first router board and the second router board comprises:
- a router for routing traffic to the appropriate storage element; and
- an offload engine.

6. The storage system of claim 5, wherein each of the first router board and the second router board further comprises:
- an alternate router; and
- an alternate offload engine.

7. The storage system of claim 1, wherein the storage elements comprise flash storage.

8. The storage system of claim 1, wherein the storage system is configured to operate in a degraded mode responsive to a single component failing.

9. The storage system of claim 1, wherein each of the first controller board and the second controller board comprises:
- a processor;
- a memory; and
- a peripheral component interconnect express interface.

10. A method of providing failover for a storage system, the method comprising:
- supplying, via a first power supply, power to a first layer without supplying power to a second layer, wherein the first layer comprises a first controller board, a first router board, and a first plurality of local storage elements;
- supplying, via a second power supply, power to the second layer without supplying power to the first layer, wherein the second layer comprises a second controller board, a second router board, and a second plurality of local storage elements;
- accessing, by the first layer, the second plurality of local storage elements using a midplane; and
- accessing, by the second layer, the first plurality of local storage elements using the midplane,
- wherein the midplane is connected to the first layer and the second layer, and the midplane is connected to the first power supply and the second power supply.

11. The method of claim 10, further comprising:
- booting the first and second layer in a quiescent state;
- determining that the first or second layer is a failed layer operating in a degraded state; and
- performing a failback process to recover the failed layer to an active state.

12. The method of claim 11, further comprising:
- performing, by a processor of the first or second controller board configured to execute instructions of a flash translation layer (FTL), at least one of: wear leveling, map table management, and garbage collection.

13. The method of claim 11, further comprising:
- routing, via a router, traffic to the first or second router board; and
- offloading operations to an offload engine.

14. The method of claim 13, further comprising:
- routing, via an alternate router, traffic to the first or second router board; and
- offloading operations to an alternate offload engine.

15. The method of claim 10, further comprising:
- operating in a degraded mode in response to a single component of the storage system failing.

16. A storage system, comprising:
- a first layer comprising a first processing means, a first routing means, and a first plurality of local storage means;
- a second layer comprising a second processing means, a second routing means, and a second plurality of local storage means; and
- a connection means connecting the first layer and the second layer, wherein:
  - the connection means is connected to a first power supply means and a second power supply means, wherein the first power supply means is configured to supply power to the first layer without supplying power to the second layer, and the second power supply means is configured to supply power to the second layer without supplying power to the first layer,
  - the first layer is configured to access the second plurality of local storage means using the connection means, and
  - the second layer is configured to access the first plurality of local storage means using the connection means.

17. The storage system of claim 16, further comprising:
- means for booting the first and second layer in a quiescent state;
- means for determining that the first or second layer is a failed layer operating in a degraded state; and
- means for performing a failback process to recover the failed layer to an active state.

18. The storage system of claim 17, wherein each of the first and second processing means are configured to execute instructions of a flash translation layer (FTL) to perform at least one of: wear leveling, map table management, and garbage collection.

19. The storage system of claim 17, wherein each of the first routing means and second routing means further comprises:
- means for routing traffic to the first and second routing means; and
- means for offloading operations.

20. The storage system of claim 16, wherein each of the first and second processing means comprises a peripheral component interconnect express interface.

* * * * *